United States Patent
Goji et al.

(10) Patent No.: US 11,865,419 B2
(45) Date of Patent: Jan. 9, 2024

(54) GOLF CLUB GRIP AND GOLF CLUB

(71) Applicant: Sumitomo Rubber Industries, Ltd., Hyogo (JP)

(72) Inventors: Sho Goji, Kobe (JP); Kazuyoshi Shiga, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 664 days.

(21) Appl. No.: 17/063,577

(22) Filed: Oct. 5, 2020

(65) Prior Publication Data
US 2021/0106890 A1 Apr. 15, 2021

(30) Foreign Application Priority Data

Oct. 15, 2019 (JP) .................................. 2019-188730

(51) Int. Cl.
| | |
|---|---|
| *A63B 53/14* | (2015.01) |
| *C08L 23/22* | (2006.01) |
| *C08L 7/00* | (2006.01) |
| *C08F 36/08* | (2006.01) |
| *C08L 23/16* | (2006.01) |
| *C08K 5/00* | (2006.01) |

(52) U.S. Cl.
CPC .............. *A63B 53/14* (2013.01); *C08F 36/08* (2013.01); *C08L 7/00* (2013.01); *C08L 23/16* (2013.01); *C08L 23/22* (2013.01); *C08K 5/0025* (2013.01)

(58) Field of Classification Search
CPC . A63B 53/14; C08F 36/08; C08L 7/00; C08L 23/16; C08L 23/22; C08K 5/0025
See application file for complete search history.

(56) References Cited

U.S. PATENT DOCUMENTS

| | | | |
|---|---|---|---|
| 2006/0270488 A1* | 11/2006 | Takeuchi | A63B 60/16 473/300 |
| 2017/0182386 A1* | 6/2017 | Inoue | C08K 5/14 |
| 2021/0332274 A1* | 10/2021 | Hoshi | C09J 133/08 |

FOREIGN PATENT DOCUMENTS

| | | | |
|---|---|---|---|
| JP | H07-292169 A | | 11/1995 |
| JP | H09206408 A | * | 8/1997 |
| JP | 2017-113388 A | | 6/2017 |
| JP | 2017122138 A | * | 7/2017 |
| JP | 2018135415 A | * | 8/2018 |
| JP | 2020162635 A | * | 10/2020 |
| WO | WO-2020067270 A1 | * | 4/2020 ............. C09J 11/08 |

* cited by examiner

*Primary Examiner* — Joshua T Kennedy
(74) *Attorney, Agent, or Firm* — Studebaker & Brackett PC

(57) ABSTRACT

A golf club grip having great anti-slipping performance in the material itself constituting the grip includes an outermost surface layer, wherein at least a part of the outermost surface layer is formed from a rubber composition containing (A) a base rubber and (B) a tackifier having a softening point in a range of from 5° C. to 120° C., and a portion formed from the rubber composition has a loss tangent (tanδ) (30° C., 10 Hz) and a complex elastic modulus (E*) (30° C., 10 Hz) satisfying a relationship of $0.070 \leq \tan\delta/(E^*)^{0.2} \leq 0.098$.

18 Claims, 2 Drawing Sheets

GOLF CLUB GRIP AND GOLF CLUB

FIELD OF THE INVENTION

The present invention relates to a golf club grip.

DESCRIPTION OF THE RELATED ART

As a grip attached to a golf club, a grip made of a rubber is widely used. For example, Japanese Patent Publication No. H07-292169 A discloses a grip formed from a material having a loss elastic modulus (E) at a temperature of 50° C. under a strain amplitude of 0.01% and a ratio (E/E$^{*2}$) of the loss elastic modulus (E) to a square value (E$^{*2}$) of a complex elastic modulus (E*) falling within a range of the following specified values in a temperature dependent measurement of a dynamic viscoelasticity under a temperature rising rate of 2° C./min and a frequency of 10 Hz:

$$(E/E^{*2}) \times 10^3 \geq -0.520E + 5.82$$

$$E/E^{*2} \geq 2.39 \times 10^{-3}$$

$$E \geq 2.35$$

[E: loss elastic modulus (kgf/cm$^2$)]
[E*: complex elastic modulus (kgf/cm$^2$)].

In addition, Japanese Patent Publication No. 2017-113388 A discloses a grip for sporting goods comprising an outermost surface layer formed from a surface layer rubber composition, wherein the surface layer rubber composition contains (A) a base rubber and (B) a resin having a softening point in a range of from 5° C. to 120° C., (A) the base rubber contains an acrylonitrile-butadiene based rubber, and (B) the resin is at least one member selected from the group consisting of a hydrogenated rosin ester, a disproportionated rosin ester, an ethylene-vinyl acetate copolymer, a coumarone resin, a phenol resin, a xylene resin and a styrene resin.

SUMMARY OF THE INVENTION

The grip is required to provide great anti-slipping performance so that the user of the golf club would swing easily. As a method of improving the anti-slipping performance of the grip, a method of forming unevenness on the grip surface is considered. However, the unevenness formed on the grip surface would be worn out for long-term usage. Thus, it is necessary to improve the anti-slipping performance of the material itself of the grip.

The present invention has been made in view of the above circumstances, and an object of the present invention is to provide a golf club grip having great anti-slipping performance in the material itself constituting the grip.

The present invention that has solved the above problem provides a golf club grip comprising an outermost surface layer, wherein at least a part of the outermost surface layer is formed from a rubber composition containing (A) a base rubber and (B) a tackifier having a softening point in a range of from 5° C. to 120° C., and a portion formed from the rubber composition has a loss tangent (tan δ) (30° C., 10 Hz) and a complex elastic modulus (E*) (30° C., 10 Hz) satisfying a relationship of 0.070≤tan δ/(E*)$^{0.2}$≤0.098. If the value of tan δ/(E*)$^{0.2}$ ranges from 0.070 to 0.098, the material itself has excellent anti-slipping performance, and thus the obtained grip has excellent anti-slipping performance.

According to the present invention, a golf club grip having excellent anti-slipping performance in the material itself constituting the grip is obtained.

DESCRIPTION OF THE PREFERRED EMBODIMENT

Figure 1:
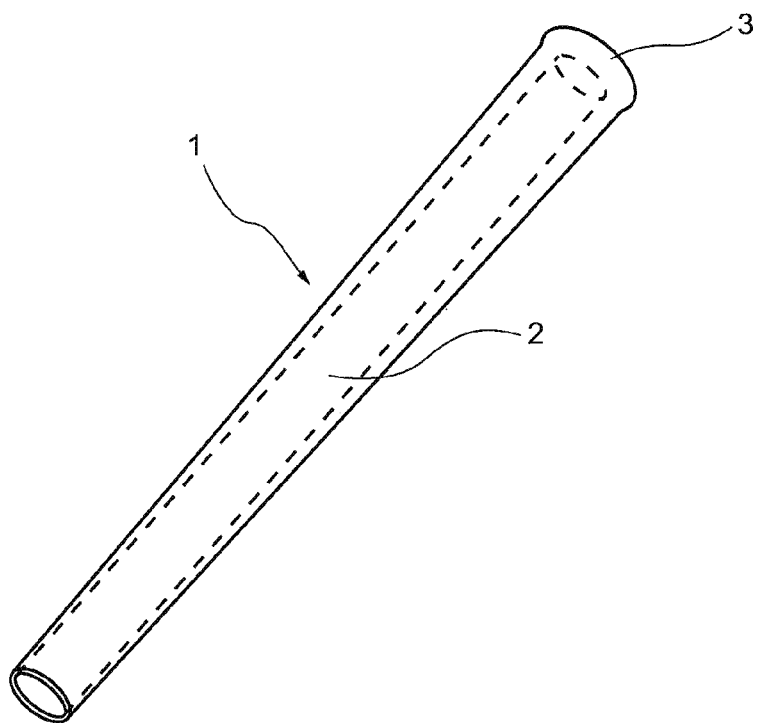
FIG. 1 is a perspective view showing one example of a golf club grip.

The present invention provides a golf club grip comprising an outermost surface layer, wherein at least a part of the outermost surface layer is formed from a rubber composition (hereinafter sometimes referred to as "first rubber composition") containing (A) a base rubber and (B) a tackifier, and a portion formed from the first rubber composition has a loss tangent (tan δ) (30° C., 10 Hz) and a complex elastic modulus (E*) (30° C., 10 Hz) satisfying a relationship of 0.070≤tan δ/(E*)$^{0.2}$≤0.098.

The loss tangent is an index of hysteresis friction. The grip deforms when swung by the user, and the energy released as heat during this deformation becomes hysteresis friction. The complex elastic modulus is an index of adhesive friction. The adhesive friction is a force required to detach the bonding between the molecule of the grip surface and the contact surface (hand or glove of the user). If these loss tangent and complex elastic modulus satisfy the relationship of 0.070≤tan δ/(E*)$^{0.2}$≤0.098, the anti-slipping performance of the grip using this material is greatest.

[Outermost Surface Layer]

At least a part of the outermost surface layer of the golf club grip is formed from the first rubber composition. Herein, the outermost surface layer is an outermost layer of the grip, i.e. a layer touched by the user when using the grip. It is preferable that at least a part of the layer of the golf club grip touched by the user when using the grip is formed from the first rubber composition. The area ratio of the portion formed from the first rubber composition in the outermost surface layer of the golf club grip is preferably 50 area % or more, more preferably 70 area % or more, and even more preferably 90 area % or more. In addition, it is also preferable that the whole part of the outermost surface layer of the golf club grip is formed from the first rubber composition. It is noted that, when the golf club grip comprises a cylindrical portion which will be described later, the whole outermost surface layer of the cylindrical portion is preferably formed from the first rubber composition.

The value of tan δ/(E*)$^{0.2}$ of the portion formed from the first rubber composition is 0.070 or more, preferably 0.071 or more, more preferably 0.075 or more, and even more preferably 0.080 or more, and is preferably 0.098 or less, more preferably 0.095 or less, and even more preferably 0.090 or less.

The loss tangent (tan δ) (30° C., 10 Hz) of the portion formed from the first rubber composition is preferably 0.086 or more, more preferably 0.090 or more, and even more preferably 0.10 or more, and is preferably 0.14 or less, more preferably 0.13 or less, and even more preferably 0.12 or less. If the loss tangent is 0.086 or more, the grip force is better, and if the loss tangent is 0.14 or less, the grip is not excessively hard, and thus the user has a feeling that the grip hardly slips.

The complex elastic modulus (E*) (30° C., 10 Hz) of the portion formed from the first rubber composition is preferably 2.0 MPa or more, more preferably 3.0 MPa or more, and even more preferably 4.0 MPa or more, and is preferably 10 MPa or less, more preferably 9.0 MPa or less, and even more preferably 8.0 MPa or less. If the complex elastic modulus is 2.0 MPa or more, the grip does not become excessively soft, and if the complex elastic modulus is 10 MPa or less, the grip does not become excessively hard.

The loss tangent and complex elastic modulus can be controlled by adjusting the type or amount of (A) the base rubber and (B) the tackifier in the rubber composition.

(First Rubber Composition)

The first rubber composition contains (A) the base rubber and (B) the tackifier.

(A) Base Rubber

The amount of (A) the base rubber in the first rubber composition is preferably 50 mass % or more, more preferably 55 mass % or more, and even more preferably 60 mass % or more. Examples of (A) the base rubber include a natural rubber (NR), an ethylene-propylene-diene rubber (EPDM), a butyl rubber (IIR), an acrylonitrile-butadiene rubber (NBR), a hydrogenated acrylonitrile-butadiene rubber (HNBR), a carboxy-modified acrylonitrile-butadiene rubber (XNBR), a butadiene rubber (BR), a styrene-butadiene rubber (SBR), a polyurethane rubber (PU), an isoprene rubber (IR), a chloroprene rubber (CR), and an ethylene-propylene rubber (EPM). These base rubbers may be used solely, or two or more of them may be used in combination.

(A) The base rubber preferably contains at least one member selected from the group consisting of the natural rubber, the isoprene rubber, the ethylene-propylene-diene rubber, and the butyl rubber. If these rubbers are contained as (A) the base rubber, (B) the tackifier added hardly bleeds out and blooms out.

The total amount of the natural rubber, isoprene rubber, ethylene-propylene-diene rubber and butyl rubber in (A) the base rubber is preferably 50 mass % or more, more preferably 70 mass % or more, and even more preferably 90 mass % or more. It is also preferable that (A) the base rubber consists of the natural rubber, isoprene rubber, ethylene-propylene-diene rubber and butyl rubber, more preferable that (A) the base rubber consists of the natural rubber, ethylene-propylene-diene rubber and butyl rubber.

(B) Tackifier (B) The tackifier has a softening point in a range of from 5° C. to 120° C. If the softening point of (B) the tackifier is 120° C. or less, (B) the tackifier is dispersed in (A) the base rubber to obtain a uniform composition during the kneading and vulcanization of the rubber composition. In addition, if the softening point of (B) the tackifier is 5° C. or more, bleeding out and blooming out of (B) the tackifier is suppressed.

The softening point of (B) the tackifier is preferably 10° C. or more, more preferably 15° C. or more, and is preferably 115° C. or less, more preferably 110° C. or less, and even more preferably 100° C. or less.

(B) the tackifier preferably contains at least one member selected from the group consisting of a rosin ester, a hydrogenated rosin ester, a disproportionated rosin ester, an ethylene-vinyl acetate copolymer, a phenol resin, a terpene resin and a xylene resin.

The rosin ester is an ester compound obtained by a reaction between a rosin and an alcohol. The rosin is a natural resin containing abietic acid, neoabietic acid, palustric acid, pimaric acid, isopimaric acid, and dehydroabietic acid. Examples of the alcohol include a monohydric alcohol such as n-octyl alcohol, 2-ethylhexyl alcohol, decyl alcohol, lauryl alcohol and stearyl alcohol; a dihydric alcohol such as ethylene glycol, diethylene glycol, polyethylene glycol, propylene glycol, dipropylene glycol, polypropylene glycol and neopentyl glycol; a trihydric alcohol such as glycerin and trimethylolpropane; a tetrahydric alcohol such as pentaerythritol and diglycerin; and a hexahydric alcohol such as dipentaerythritol and sorbitol. Among them, the polyhydric alcohol such as the dihydric alcohol or higher alcohol is preferable, and glycerin is more preferable.

The hydrogenated rosin ester and the disproportionated rosin ester are so-called stabilized rosin esters. The hydrogenated rosin ester is an ester compound having the moiety derived from the rosin of the rosin ester being hydrogenated. The hydrogenated rosin ester may be obtained by a method of hydrogenating the rosin followed by carrying out a reaction between the obtained hydrogenated rosin and an alcohol, or a method of carrying out a reaction between the rosin and an alcohol followed by hydrogenating the obtained rosin ester.

The disproportionated rosin ester is an ester compound having the moiety derived from the rosin of the rosin ester being disproportionated. The disproportionated rosin ester may be obtained by a method of disproportionating the rosin followed by carrying out a reaction between the obtained disproportionated rosin and an alcohol, or a method of carrying out a reaction between the rosin and an alcohol followed by disproportionating the obtained rosin ester.

The acid value of the rosin ester, hydrogenated rosin ester and disproportionated rosin ester is preferably 2 mgKOH/g or more, more preferably 4 mgKOH/g or more, and even more preferably 6 mgKOH/g or more, and is preferably 200 mgKOH/g or less, more preferably 180 mgKOH/g or less, and even more preferably 160 mgKOH/g or less. If the acid value is 2 mgKOH/g or more, the effect of imparting the tackiness is greater, and thus the anti-slipping performance of the material itself of the obtained grip is further enhanced, and if the acid value is 200 mgKOH/g or less, the weather resistance of the obtained grip is further enhanced, and thus variation of the frictional coefficient of the grip with time hardly occurs.

A commercial product may be used as the rosin ester, hydrogenated rosin ester and disproportionated rosin ester, and examples of the commercial product include HARI-TACK SE10, PH, F85, F105 FK100 (available from Harima Chemicals Group, Inc.), and SYLVATAC (registered trademark) RE5S (available from KRATON Corporation).

The amount of vinyl acetate in the ethylene-vinyl acetate copolymer is preferably 10 mass % or more, more preferably 12 mass % or more, and even more preferably 15 mass % or more, and is preferably 80 mass % or less, more preferably 75 mass % or less, and even more preferably 70 mass % or less. If the amount of vinyl acetate is 10 mass % or more, the effect of improving the grip performance of the outermost surface layer under a wet condition is greater, and if the amount of vinyl acetate is 80 mass % or less, lowering in the abrasion resistance of the outermost surface layer is suppressed.

A commercial product may be used as the ethylene-vinyl acetate copolymer, and examples of the commercial product include Ultrasen (registered trademark) 680, 681, 720, 722, 750, 760 (available from Tosoh Corporation), and Levapren (registered trademark) 400, 450, 500, 600, 700, 800 (available from ARLANXEO Corporation).

The terpene-based resin is not particularly limited, as long as the terpene-based resin is a polymer having a terpene compound as a constituent component. The terpene-based resin is preferably, for example, at least one member selected from the group consisting of a terpene polymer, a terpene-phenol copolymer, a terpene-styrene copolymer, a terpenephenol-styrene copolymer, a hydrogenated terpene-phenol copolymer, a hydrogenated terpene-styrene copolymer, and a hydrogenated terpene-phenol-styrene copolymer.

Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. The terpene compound may be used solely, or two or more of them may be used in combination.

The amount of (B) the tackifier is preferably 3 parts by mass or more, more preferably 4 parts by mass or more, even more preferably 6 parts by mass or more, and most preferably 8 parts by mass or more, and is preferably 30 parts by mass or less, more preferably 25 parts by mass or less, and even more preferably 20 parts by mass or less, with respect to 100 parts by mass of (A) the base rubber. If the amount of (B) the tackifier is 3 parts by mass or more, the effect of improving the frictional coefficient is greater, and if the amount of (B) the tackifier is 30 parts by mass or less, lowering in the abrasion resistance of the grip can be suppressed.

The mass ratio (the reinforcing material/(B) the tackifier) of the amount of the reinforcing material which will be described later to the amount of (B) the tackifier is preferably 0.1 or more, more preferably 0.2 or more, and even more preferably 0.3 or more, and is preferably 5.0 or less, more preferably 4.0 or less, and even more preferably 3.0 or less. If the mass ratio (the reinforcing material/(B) the tackifier) is 0.1 or more, the excessive softness of the grip by the addition of (B) the tackifier is suppressed, and if the mass ratio (the reinforcing material/(B) the tackifier) is 5.0 or less, the adsorption of (B) the tackifier to the reinforcing material such as carbon is suppressed, and thus the effect of improving the anti-slipping performance by (B) the tackifier is further exerted.

(Crosslinking Agent)

The first rubber composition contains a crosslinking agent in addition to (A) the base rubber and (B) the tackifier. As the crosslinking agent, a sulfur crosslinking agent and an organic peroxide can be used. Examples of the sulfur crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis(t-butylperoxy-m-diisopropyl) benzene, 2,5-dimethyl-2,5-di(t-butylperoxy) hexane, and 1,1-bis(t-butylperoxy)-3,3,5-trimethylcyclohexane. The crosslinking agent may be used solely, or two or more of them may be used in combination. As the crosslinking agent, the sulfur crosslinking agent is preferred, and the elemental sulfur is more preferred. The amount of the crosslinking agent is preferably 0.2 part by mass or more, more preferably 0.4 part by mass or more, and even more preferably 0.6 part by mass or more, and is preferably 4.0 parts by mass or less, more preferably 3.5 parts by mass or less, and even more preferably 3.0 parts by mass or less, with respect to 100 parts by mass of (A) the base rubber.

The first rubber composition preferably further contains a vulcanization accelerator or a vulcanization activator.

(Vulcanization Accelerator)

Examples of the vulcanization accelerator include thiurams such as tetramethylthiuram disulfide (TMTD), tetrabenzylthiuram disulfide (TBzTD), tetramethylthiuram monosulfide (TMTM), dipentamethylenethiuram tetrasulfide and tetrakis(2-ethylhexyl)thiuram disulfide; guanidines such as diphenylguanidine (DPG); dithiocarbamates such as zinc dimethyldithiocarbamate (ZnPDC), and zinc dibutyldithiocarbamate; thioureas such as trimethylthiourea, and N,N'-diethylthiourea; thiazoles such as mercaptobenzothiazole (MBT), and benzothiazole disulfide; and sulfenamides such as N-cyclohexyl-2-benzothiazolylsulfenamide (CBS), and N-t-butyl-2-benzothiazolylsulfenamide (BBS). These vulcanization accelerators may be used solely, or two or more of them may be used in combination. The total amount of the vulcanization accelerator is preferably 0.4 part by mass or more, more preferably 0.8 part by mass or more, and even more preferably 1.2 parts by mass or more, and is preferably 8.0 parts by mass or less, more preferably 7.0 parts by mass or less, and even more preferably 6.0 parts by mass or less, with respect to 100 parts by mass of (A) the base rubber.

(Vulcanization Activator)

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chrome peroxide, magnesium peroxide, and calcium peroxide. Examples of the fatty acid include stearic acid, oleic acid, and palmitic acid. These vulcanization activators may be used solely, or two or more of them may be used in combination. The total amount of the vulcanization activator is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less, with respect to 100 parts by mass of (A) the base rubber.

The rubber composition may further contain a reinforcing material, an antioxidant, a softening agent, an anti-scorching agent, a coloring agent, or the like, where necessary.

Examples of the reinforcing material include carbon black and silica. The amount of the reinforcing material is preferably 2.0 parts by mass or more, more preferably 3.0 parts by mass or more, and even more preferably 4.0 parts by mass or more, and is preferably 50 parts by mass or less, more preferably 45 parts by mass or less, and even more preferably 40 parts by mass or less, with respect to 100 parts by mass of (A) the base rubber.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-α-naphtylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, and even more preferably 0.4 part by mass or more, and is preferably 5.0 parts by mass or less, more preferably 4.8 parts by mass or less, and even more preferably 4.6 parts by mass or less, with respect to 100 parts by mass of (A) the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the anti-scorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio)phthalimide, sulfonamide derivative, diphenyl urea, bis(tridecyl)pentaerythritol diphosphite, and 2-mercaptobenzimidazole.

The first rubber composition may be prepared by a conventional method. For example, the first rubber composition may be prepared by kneading materials with a kneading machine such as a Banbury mixer, a kneader and an open roll. It is noted that when the first rubber composition contains microballoons which will be described later, other components except the microballoons are preferably kneaded in advance followed by kneading the kneaded product and the microballoons. The material temperature when kneading the kneaded product and the microballoons is preferably set at a temperature lower than the expansion stating temperature of the microballoons.

The outermost surface layer may be a solid layer or a porous layer. If the outermost surface layer is the porous layer, the golf club grip has a light weight. The porous layer is a layer having a plurality of fine pores (voids) formed in the rubber which is the base material. If a plurality of fine pores are formed, the layer has a low apparent density, and thus the golf club grip has a light weight.

Examples of the method producing the porous layer include a balloon foaming method, chemical foaming method, supercritical carbon dioxide injection molding method, salt extraction method, and solvent removing method. In the balloon foaming method, microballoons are allowed to be contained in the rubber composition, and then be expanded by heating to perform foaming. In addition, the expanded microballoons may be blended in the rubber composition, and then the resultant rubber composition is molded. In the chemical foaming method, a foaming agent (such as azodicarbonamide, azobisisobutyronitrile, N,N'-dinitrosopentamethylenetetramine, p-toluenesulfonyl hydrazine, and p-oxybis(benzenesulfonohydrazide)) and a foaming auxiliary are allowed to be contained in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and carbon dioxide is gasified to perform foaming. In the salt extraction method, a soluble salt (such as boric acid and calcium chloride) is allowed to be contained in the rubber composition, and then the salt is dissolved and extracted after molding to form fine pores. In the solvent removing method, a solvent is allowed to be contained in the rubber composition, and then the solvent is removed after molding to form fine pores.

When the outermost surface layer is a porous layer, a foamed layer formed from a first rubber composition containing a foaming agent is preferred. In particular, a foamed layer formed by the balloon foaming method is preferred. In other words, the outermost surface layer is preferably a foamed layer formed from the first rubber composition containing microballoons. If microballoons are used, the outermost surface layer has a light weight while maintaining the mechanical strength thereof.

As the microballoons, organic microballoons or inorganic microballoons may be used. Examples of the organic microballoons include hollow particles formed from a thermoplastic resin, and resin capsules encapsulating a hydrocarbon having a low boiling point in a shell formed from a thermoplastic resin. Specific examples of the resin capsules include Expancel (registered trademark) manufactured by Akzo Nobel Company, and Matsumoto Microsphere (registered trademark) manufactured by Matsumoto Yushi Seiyaku Co., Ltd. Examples of the inorganic microballoons include hollow glass particles (such as silica balloons and alumina balloons), and hollow ceramic particles.

The volume average particle size of the resin capsule (before expansion) is preferably 5 μm or more, more preferably 6 μm or more, and even more preferably 9 μm or more, and is preferably 90 μm or less, more preferably 70 μm or less, and even more preferably 60 μm or less.

When the outermost surface layer is produced by the balloon foaming method, the amount of the microballoons in the first rubber composition is preferably 1.0 part by mass or more, more preferably 1.2 parts by mass or more, and even more preferably 1.5 parts by mass or more, and is preferably 10 parts by mass or less, more preferably 8 parts by mass or less, and even more preferably 6 parts by mass or less, with respect to 100 parts by mass of the base rubber. If the amount of the microballoons is 1.0 part by mass or more, foaming can be performed more uniformly at the time of forming the porous layer, and if the amount of the microballoons is 10 parts by mass or less, the porous layer strikes a good balance between the light weight and the mechanical strength.

The material hardness (Shore A hardness) of the first rubber composition is preferably 25 or more, more preferably 28 or more, and even more preferably 30 or more, and is preferably 60 or less, more preferably 55 or less, and even more preferably 50 or less. If the material hardness (Shore A hardness) of the first rubber composition is 25 or more, the outermost surface layer has further enhanced mechanical strength, and if the material hardness (Shore A hardness) of the first rubber composition is 60 or less, the outermost surface layer does not become excessively hard, and thus the grip feeling when holding the grip becomes better.

[Other Portion]

The material for forming other portion of the golf club grip than the portion formed from the first rubber composition is not particularly limited. Examples of the second composition for forming the other portion include a second rubber composition and a resin composition.

The second rubber composition preferably contains a base rubber and a crosslinking agent. Examples of the base rubber include a natural rubber (NR), an ethylene-propylene-diene rubber (EPDM), a butyl rubber (IIR), an acrylonitrile-butadiene rubber (NBR), a hydrogenated acrylonitrile-butadiene rubber (HNBR), a carboxy-modified acrylonitrile-butadiene rubber (XNBR), a carboxy-modified hydrogenated acrylonitrile-butadiene rubber (HXNBR), a butadiene rubber (BR), a styrene-butadiene rubber (SBR), a polyurethane rubber (PU), an isoprene rubber (IR), a chloroprene rubber (CR), and an ethylene-propylene rubber (EPM). Among them, the base rubber is preferably NR, EPDM, IIR, NBR, HNBR, XNBR, HXNBR, BR, SBR, or PU.

Examples of the crosslinking agent used for the second rubber composition include the same one as those employed in the first rubber composition, and the elemental sulfur is preferable. The second rubber composition preferably further contains a vulcanization accelerator and a vulcanization activator. Examples of these vulcanization accelerator and vulcanization activator include the same one as those employed in the first rubber composition. As the vulcanization accelerator, N-t-butyl-2-benzothiazolylsulfenamide and tetrabenzylthiuram disulfide are preferable. As the vulcanization activator, zinc oxide and stearic acid are preferable.

The second rubber composition may further contain a reinforcing material, an antioxidant, a softening agent, a coloring agent, an anti-scorching agent, or the like, where necessary. Examples of the reinforcing material, antioxidant, and coloring agent include the same one as those employed in the first rubber composition. As the reinforcing material, carbon black or silica is preferable. As the antioxidant, 2,2'-methylene bis(4-methyl-6-t-butylphenol) is preferable.

The second rubber composition may be prepared by a conventional method. For example, the second rubber composition may be prepared by kneading materials with a kneading machine such as a Banbury mixer, a kneader and an open roll. The temperature (material temperature) performing the kneading preferably ranges from 70° C. to 160° C. It is noted that when the second rubber composition contains microballoons, the kneading is preferably performed at a temperature lower than the expansion stating temperature of the microballoons.

The resin composition contains a base resin. Examples of the base resin include a polyurethane resin, a polystyrene resin, a polyethylene resin, a polypropylene resin, an ethylene-vinyl acetate copolymer resin, and a polyethylene terephthalate resin.

The second composition for forming the other portion is preferably the second rubber composition, and preferably contains the natural rubber (NR), the ethylene-propylene-diene rubber (EPDM) or the butyl rubber (IIR) as the base rubber. In addition, it is also preferable that when the first rubber composition contains a natural rubber as (A) the base rubber, the second rubber composition for forming the other portion also contains a natural rubber as the base rubber. If the composition for forming the other portion contains a natural rubber, the adhesion between the portion formed from the first rubber composition and the other portion is enhanced.

The other portion may be solid or porous. When the other portion is porous, the other portion is preferably a foamed construction formed from the second composition containing microballoons. If the microballoons are used, the formed portion has a light weight while maintaining the mechanical strength thereof. Examples of the microballoons include the same one as those employed in the first rubber composition, and the resin capsule encapsulating the hydrocarbon having the low boiling point in the shell formed from the thermoplastic resin is preferable.

[Construction]

The shape of the golf club grip is not particularly limited, and a golf club grip having a cylindrical portion is preferable. If the golf club grip has a cylindrical portion, a shaft or the like can be inserted into the cylindrical portion. In addition, the cylindrical portion may be single layered or multiple layered. When the cylindrical portion is single layered, the whole cylindrical portion is formed from the first rubber composition. When the cylindrical portion is multiple layered, at least a part of or a whole part of the outermost surface layer is formed from the first rubber composition.

The thickness of the cylindrical portion is preferably 0.5 mm or more, more preferably 1.0 mm or more, even more preferably 1.5 mm or more, and is preferably 17.0 mm or less, more preferably 10.0 mm or less, even more preferably 8.0 mm or less. The cylindrical portion may be formed with a fixed thickness along the axis direction, or may be formed with a thickness gradually becoming thicker from the front end toward the back end.

The golf club grip preferably has a dual-layered cylindrical portion composed of a cylindrical inner layer and a cylindrical outer layer covering the inner layer. If the cylindrical portion is dual-layered, the mechanical properties of the cylindrical portion are easily controlled. It is preferable that at least a part of the outer layer is formed from the first rubber composition, more preferable that the whole outer layer is formed from the first rubber composition.

The outer layer and the inner layer may have a uniform thickness, or may have a varied thickness. For example, the outer layer and the inner layer may be formed with a thickness gradually becoming thicker from one end toward another end along the axis direction of the cylindrical grip. The outer layer preferably has a uniform thickness.

When the cylindrical portion has a thickness in a range of from 0.5 mm to 17.0 mm, the thickness of the outer layer is preferably 0.5 mm or more, more preferably 0.6 mm or more, and even more preferably 0.7 mm or more, and is preferably 2.5 mm or less, more preferably 2.3 mm or less, and even more preferably 2.1 mm or less. If the thickness of the outer layer is 0.5 mm or more, the reinforcing effect by the outer layer material becomes greater, and if the thickness of the outer layer is 2.5 mm or less, the inner layer can be relatively thickened and thus the effect of reducing the weight of the grip becomes greater.

The percentage ((thickness of outer layer/thickness of cylindrical portion)×100) of the thickness of outer layer to the thickness of cylindrical portion is preferably 0.5% or more, more preferably 1.0% or more, and even more preferably 1.5% or more, and is preferably 99.0% or less, more preferably 98.0% or less, and even more preferably 97.0% or less. If the percentage is 0.5% or more, the reinforcing effect by the outer layer material becomes greater, and if the percentage is 99.0% or less, the inner layer can be relatively thickened and thus the effect of reducing the weight of the grip becomes greater.

The material hardness (Shore A hardness) of the second composition is preferably 30 or more, more preferably 35 or more, and even more preferably 40 or more, and is preferably 60 or less, more preferably 55 or less, and even more preferably 50 or less. If the material hardness (Shore A hardness) of the second composition is 30 or more, the inner layer does not become excessively soft and thus a tightly fixed touch feeling can be obtained when holding the grip, and if the material hardness (Shore A hardness) of the second composition is 60 or less, the inner layer does not become excessively hard and thus the grip feeling when holding the grip becomes better.

The material hardness H1 (Shore C hardness) of the first rubber composition is preferably equal to or higher than the material hardness H2 (Shore C hardness) of the second composition. In this case, the hardness difference (H1−H2) (Shore C hardness) is preferably 46 or more, more preferably 47 or more, and even more preferably 48 or more, and is preferably 60 or less, more preferably 59 or less, and even more preferably 58 or less. If the hardness difference (H1−H2) falls within the above range, the grip feeling when holding the grip becomes better.

Examples of the combination of the outer layer and the inner layer include a combination of a solid outer layer and a solid inner layer, a combination of a solid outer layer and a porous inner layer, and a combination of a porous outer layer and a porous inner layer. Among them, the combination of the solid outer layer and the porous inner layer, and the combination of the porous outer layer and the porous inner layer are preferable. If the inner layer is porous, the inner layer has lowered mechanical strength although the grip has a light weight. However, since the first rubber composition is excellent in the mechanical strength, even if the inner layer is porous, the mechanical strength of the grip can be maintained.

The inner layer is preferably a porous layer, more preferably a foamed layer produced by the balloon foaming method. When the inner layer is produced by the balloon foaming method, the amount of the microballoons in the second composition is preferably 5 parts by mass or more, more preferably 8 parts by mass or more, and even more preferably 12 parts by mass or more, and is preferably 20 parts by mass or less, more preferably 18 parts by mass or less, and even more preferably 15 parts by mass or less, with respect to 100 parts by mass of the base material (base rubber or base resin). If the amount of the microballoons is 5 parts by mass or more, the grip has a lighter weight, and if the amount of the microballoons is 20 parts by mass or less, lowering in the mechanical strength of the inner layer can be suppressed.

In addition, the foaming ratio of the inner layer prepared by the balloon foaming method is preferably 1.2 or more, more preferably 1.5 or more, and even more preferably 1.8 or more, and is preferably 5.0 or less, more preferably 4.5 or less, and even more preferably 4.0 or less. If the foaming ratio is 1.2 or more, the grip has a lighter weight, and if the foaming ratio is 5.0 or less, lowering in the mechanical strength of the inner layer can be suppressed.

The golf club grip may be obtained by molding the first rubber composition in a mold. Examples of the molding method include a press molding method and an injection molding method. In addition, the golf club grip having an inner layer and an outer layer may be obtained, for example, by press molding a laminated product composed of an unvulcanized rubber sheet formed from the first rubber composition and an unvulcanized rubber sheet formed from the second rubber composition in a mold. When the press molding method is adopted, the temperature of the mold preferably ranges from 140° C. to 200° C., the molding time preferably ranges from 5 minutes to 40 minutes, and the molding press preferably ranges from 0.1 MPa to 100 MPa.

Examples of the shape of the golf club grip include a shape having a cylindrical portion for inserting a shaft, and an integrally molded cap portion for covering the opening of the back end of the cylindrical portion. At least a part of the outermost surface layer of the cylindrical portion is formed from the first rubber composition. Further, the cylindrical portion preferably has a laminated construction composed of an inner layer and an outer layer. In this case, the outer layer is formed from the first rubber composition.

The cylindrical portion may be formed with a fixed thickness along the axis direction, or may be formed with a thickness gradually becoming thicker from the front end toward the back end. In addition, the cylindrical portion may be formed with a fixed thickness along the diameter direction, or a projecting strip portion (so-called back line) may be formed on a part of the cylindrical portion. Furthermore, grooves may be formed on the surface of the cylindrical portion. Formation of a water film between the hand of the golfer and the grip may be suppressed by the grooves, and thus the grip performance under a wet condition is further enhanced. In addition, in view of the anti-slipping performance and abrasion resistance of the grip, a reinforcing cord may be disposed in the grip.

The mass of the golf club grip is preferably 16 g or more, more preferably 18 g or more, and even more preferably 20 g or more, and is preferably 35 g or less, more preferably 32 g or less, and even more preferably 30 g or less.

[Golf Club]

The present invention also includes a golf club using the above golf club grip. The golf club comprises a shaft, a head provided on one end of the shaft, and a grip provided on another end of the shaft, wherein the grip is the golf club grip according to the present invention. The shaft can be made of stainless steel or a carbon fiber reinforced resin. Examples of the head include a wood type, a utility type, and an iron type. The material constituting the head is not particularly limited, and examples thereof include titanium, titanium alloy, carbon fiber reinforced plastic, stainless steel, maraging steel and soft iron.

Next, the golf club grip and the golf club will be explained with reference to figures. FIG. 1 is a perspective view showing one example of a golf club grip. A grip 1 has a cylindrical portion 2 for inserting a shaft, and an integrally molded cap portion 3 for covering the opening of the back end of the cylindrical portion.

Figure 2:
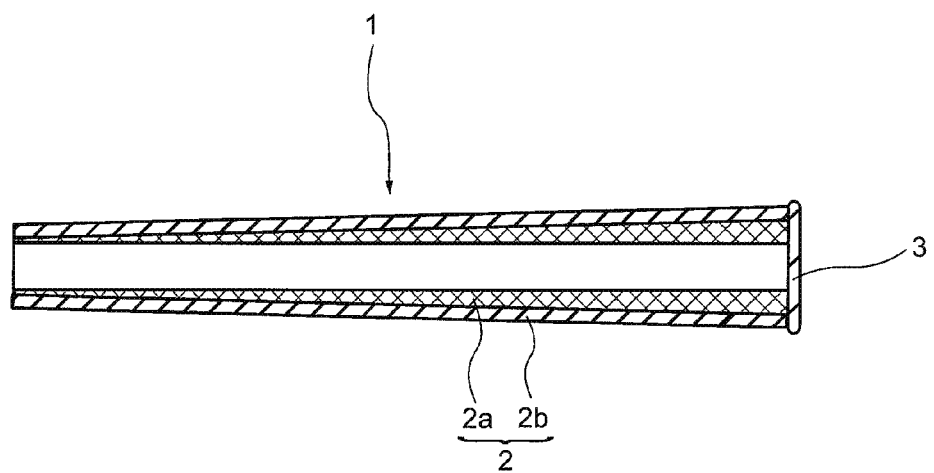
FIG. 2 is a schematic cross-sectional view showing one example of a golf club grip.

FIG. 2 is a schematic cross-sectional view showing one example of a golf club grip. A cylindrical portion 2 is composed of an inner layer 2a and an outer layer 2b. The outer layer 2b is formed with a uniform thickness throughout the entire region from the front end to the back end. The inner layer 2a is formed with a thickness gradually becoming thicker from the front end toward the back end. In the grip 1 shown in FIG. 2, the cap portion 3 is formed from the same rubber composition as the outer layer 2b.

Figure 3:
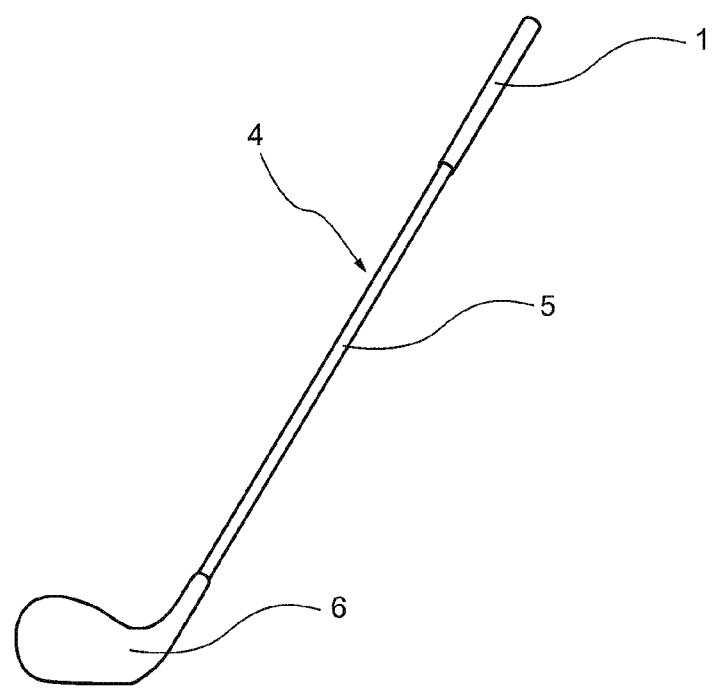
FIG. 3 is a perspective view showing one example of a golf club.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical portion 2 of the grip 1.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Material Hardness (Shore a Hardness)

Sheets with a thickness of about 2 mm were produced by pressing the rubber composition at a temperature of 160° C. for 8 to 20 minutes. It is noted that when the rubber composition contains the microballoons, the sheets were formed by expanding the microballoons in the same foaming ratio as that when forming the grip. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore A".

(2) Viscoelastic Properties

The tan δ and E* were measured with a dynamic viscoelastic spectrometer (Rheogel-E4000 available from UBM KK). The test sample was prepared by pressing the outer layer rubber composition at a temperature of 160° C. to obtain a rubber plate, and punching the rubber plate into a determined size. The measurement was performed under conditions of a temperature range: −100° C. to 100° C., a temperature rising rate: 3° C./min, a measuring interval: 3° C., a frequency: 10 Hz, a jig: tensile mode, and a sample shape: width of 4 m, thickness of 1 mm and length of 40 mm.

The tan δ and E* were calculated from the viscoelastic spectrum obtained by the dynamic viscoelastic measurement.

(3) Frictional Coefficient

The frictional coefficient was measured with a static-dynamic friction tester (TL201 Ts available from Trinity-Lab Inc.). Specifically, a square rubber piece with a side length of 1 cm was cut from the golf club grip, and the square rubber piece was adopted as the test piece (mass: 1.6 g). The test piece was fixed as a measuring tip to the measuring unit of the tester, a flooring material was fixed to a moving table, and the dynamic friction of the test piece relative to the flooring material was measured. The test was performed under conditions of a moving distance: 1 cm, a moving speed: 1 mm/sec, and a load: 25 g, and an artificial leather (Clarino (registered trademark) available from Kuraray Co. Ltd.) was used as the flooring material. The dynamic frictional coefficient was an average value measured in a region of from a position where the friction movement started to a distance of 1 cm. Test pieces cut from the vicinity of the bat side of the grip, cut from the vicinity of the tip side of the grip, and cut from the central part in the axis direction of the grip were used for the measurement, and the measured values of these test pieces were averaged. It is noted that the frictional coefficient of the grip No. 14 was defined as an index of 100, and the frictional coefficient is a value represented by converting the frictional coefficient of each grip into this index.

[Production of Grip]

According to the formulations shown in Tables 1 to 3, the materials were kneaded to prepare the outer layer rubber compositions and the inner layer rubber compositions. It is noted that, the outer layer rubber compositions were prepared by kneading all the materials with a Banbury mixer, and the inner layer rubber compositions were prepared by kneading the materials except the microballoons with a Banbury mixer followed by blending the microballoons therein with a roll. The material temperature when kneading the inner layer rubber compositions with the Banbury mixer and the material temperature when blending the microballoons with the roll is lower than the expansion starting temperature of the microballoons.

TABLE 1

| | Outer layer rubber composition No. | | A | B | C | D | E | F | G | H | I |
|---|---|---|---|---|---|---|---|---|---|---|---|
| Formulation (parts by mass) | Base rubber | NR | 70 | 70 | 70 | 70 | 70 | 70 | 70 | 70 | 70 |
| | | EPDM | 30 | 30 | 30 | 30 | 30 | 30 | 30 | 30 | 30 |
| | | IIR | 5 | 5 | 5 | 5 | 5 | 5 | 5 | 5 | 5 |
| | Tackifier | HARITACK SE10 | — | — | — | — | 10 | 15 | 15 | 15 | 15 |
| | | Sylvatac RE5S | — | — | — | — | — | — | — | — | — |
| | | Levapren 500 | — | — | — | — | — | — | — | — | — |
| | Reinforcing material | DIABLACK N220 | 4 | 10 | 20 | 30 | 4 | 4 | 10 | 20 | 30 |
| | | ULTRASIL VN3 GR | 8 | 8 | 8 | 8 | 8 | 8 | 8 | 8 | 8 |
| | Crosslinking agent | Sulfur | 2.0 | 2.0 | 2.0 | 2.0 | 2.0 | 2.0 | 2.0 | 2.0 | 2.0 |
| | Vulcanization accelerator | NOCCELER NS | 1 | 1 | 1 | 1 | 1 | 1 | 1 | 1 | 1 |
| | | NOCCELER CZ | 1 | 1 | 1 | 1 | 1 | 1 | 1 | 1 | 1 |
| | | SOXINOL D | 1 | 1 | 1 | 1 | 1 | 1 | 1 | 1 | 1 |
| | Vulcanization activator | Zinc oxide | 3 | 3 | 3 | 3 | 3 | 3 | 3 | 3 | 3 |
| | Antioxidant | NOCRAC NS-6 | 0.5 | 0.5 | 0.5 | 0.5 | 0.5 | 0.5 | 0.5 | 0.5 | 0.5 |
| | Oil | PW380 | 2 | 2 | 2 | 2 | 2 | 2 | 2 | 2 | 2 |
| Properties | Material hardness (Shore A) | | 40 | 43 | 49 | 51 | 36 | 35 | 38 | 43 | 50 |
| | tanδ (30° C., 10 Hz) | | 0.080 | 0.085 | 0.094 | 0.106 | 0.094 | 0.102 | 0.096 | 0.124 | 0.120 |
| | E* (30° C., 10 Hz) (MPa) | | 2.53 | 3.16 | 4.92 | 8.24 | 2.53 | 2.06 | 2.49 | 4.50 | 7.63 |
| | tanδ/(E*)$^{0.2}$ | | 0.066 | 0.067 | 0.068 | 0.070 | 0.078 | 0.088 | 0.080 | 0.092 | 0.080 |

TABLE 2

| | Outer layer rubber composition No. | | J | K | L | M | N | O |
|---|---|---|---|---|---|---|---|---|
| Formulation (parts by mass) | Base rubber | NR | 70 | 70 | 70 | 70 | 70 | 70 |
| | | EPDM | 30 | 30 | 30 | 30 | 30 | 30 |
| | | IIR | 5 | 5 | 5 | 5 | 5 | 5 |
| | Tackifier | HARITACK SE10 | — | — | — | — | — | — |
| | | Sylvatac RE5S | 5 | 15 | — | — | — | — |
| | | Levapren 500 | — | — | 5 | 10 | 10 | 10 |
| | Reinforcing material | DIABLACK N220 | 4 | 4 | 4 | 4 | 10 | 20 |
| | | ULTRASIL VN3 GR | 8 | 8 | 8 | 8 | 8 | 8 |
| | Crosslinking agent | Sulfur | 2.0 | 2.0 | 2.0 | 2.0 | 2.0 | 2.0 |
| | Vulcanization accelerator | NOCCELER NS | 1 | 1 | 1 | 1 | 1 | 1 |
| | | NOCCELER CZ | 1 | 1 | 1 | 1 | 1 | 1 |
| | | SOXINOL D | 1 | 1 | 1 | 1 | 1 | 1 |
| | Vulcanization activator | Zinc oxide | 3 | 3 | 3 | 3 | 3 | 3 |
| | Antioxidant | NOCRAC NS-6 | 0.5 | 0.5 | 0.5 | 0.5 | 0.5 | 0.5 |
| | Oil | PW380 | 2 | 2 | 2 | 2 | 2 | 2 |
| Properties | Material hardness (Shore A) | | 37 | 35 | 40 | 40 | 43 | 48 |
| | tanδ (30° C., 10 Hz) | | 0.087 | 0.092 | 0.088 | 0.101 | 0.101 | 0.104 |
| | E* (30° C., 10 Hz) (MPa) | | 2.44 | 2.00 | 2.82 | 2.68 | 3.39 | 5.30 |
| | tanδ/(E*)$^{0.2}$ | | 0.073 | 0.080 | 0.071 | 0.083 | 0.079 | 0.075 |

TABLE 2-continued

| Outer layer rubber composition No. | | | P | Q | R | S | T |
|---|---|---|---|---|---|---|---|
| Formulation (parts by mass) | Base rubber | NR | 70 | 70 | 70 | 70 | 70 |
| | | EPDM | 30 | 30 | 30 | 30 | 30 |
| | | IIR | 5 | 5 | 5 | 5 | 5 |
| | Tackifier | HARITACK SE10 | — | — | 1 | — | — |
| | | Sylvatac RE5S | — | — | — | — | — |
| | | Levapren 500 | 10 | 15 | — | 1 | 40 |
| | Reinforcing material | DIABLACK N220 | 30 | 4 | 4 | 4 | 4 |
| | | ULTRASIL VN3 GR | 8 | 8 | 8 | 8 | 8 |
| | Crosslinking agent | Sulfur | 2.0 | 2.0 | 2.0 | 2.0 | 2.0 |
| | Vulcanization accelerator | NOCCELER NS | 1 | 1 | 1 | 1 | 1 |
| | | NOCCELER CZ | 1 | 1 | 1 | 1 | 1 |
| | | SOXINOL D | 1 | 1 | 1 | 1 | 1 |
| | Vulcanization activator | Zinc oxide | 3 | 3 | 3 | 3 | 3 |
| | Antioxidant | NOCRAC NS-6 | 0.5 | 0.5 | 0.5 | 0.5 | 0.5 |
| | Oil | PW380 | 2 | 2 | 2 | 2 | 2 |
| Properties | Material hardness (Shore A) | | 55 | 39 | 41 | 37 | 42 |
| | tanδ (30° C., 10 Hz) | | 0.111 | 0.104 | 0.082 | 0.119 | 0.077 |
| | E* (30° C., 10 Hz) (MPa) | | 9.65 | 2.81 | 2.79 | 2.52 | 2.66 |
| | tanδ/(E*)$^{0.2}$ | | 0.070 | 0.085 | 0.067 | 0.099 | 0.063 |

TABLE 3

| Inner layer rubber composition No. | | | a |
|---|---|---|---|
| Formulation (parts by mass) | Base rubber | NR | 70 |
| | | EPDM | 30 |
| | | IIR | 5 |
| | Reinforcing material | DIABLACK N220 | 4 |
| | | ULTRASIL VN3 GR | 8 |
| | Crosslinking agent | Sulfur | 2.0 |
| | Vulcanization accelerator | NOCCELER NS | 1 |
| | | NOCCELER CZ | 1 |
| | | SOXINOL D | 1 |
| | Vulcanization activator | Zinc oxide | 3 |
| | Antioxidant | NOCRAC NS-6 | 0.5 |
| | Retarder | Santogard PVI | 0.5 |
| | | Benzoic acid | 0.3 |
| | Oil | PW380 | 2 |
| | Foaming agent | Microballoons | 12 |

The materials used in Tables 1 to 3 are shown as follows.

NR (natural rubber): TSR20

EPDM (ethylene-propylene-diene rubber): ESPRENE (registered trademark) 505A available from Sumitomo Chemical Co., Ltd.

IIR: JSR BUTYL 065 available from JSR Corporation

HARITACK SE10: hydrogenated rosin ester (softening point: 78° C. to 87° C., acid value: 2 mgKOH/g to 10 mgKOH/g) available from Harima Chemicals Group, Inc.

Sylvatac RE5S: rosin ester (softening point: 25° C. or less, acid value: 16 mgKOH/g) available from KRATON Corporation Levapren (registered trademark) 500: ethylene-vinyl acetate copolymer (vinyl acetate amount: 50 mass %, softening point: more than 100° C. and not higher than 120° C.) available from ARLANXEO Corporation DIABLACK (registered trademark) N220: carbon black available from Mitsubishi Chemical Corporation ULTRASIL VN3 GR: granulated silica available from EVONIK Industries Sulfur: 5% oil treated sulfur fine powder (200 mesh) available from Tsurumi Chemical Industry Co., Ltd.

NOCCELER NS: N-t-butyl-2-benzothiazolylsulfenamide available from Ouchi Shinko Chemical Industrial Co., Ltd.

NOCCELER CZ: N-cyclohexyl-2-benzothiazolylsulfenamide available from Ouchi Shinko Chemical Industrial Co., Ltd.

SOXINOL D: 1,3-diphenyl guanidine available from Sumitomo Chemical Co., Ltd.

Zinc oxide: WHITE SHEEL available from PT. INDO LYSAGHT

NOCRAC NS-6: 2,2'-methylene bis(4-methyl-6-t-butylphenol) available from Ouchi Shinko Chemical Industrial Co., Ltd.

PW380: Diana process oil PW380 available from Idemitsu Kosan Co., Ltd.

Santogard PVI: N-cyclohexylthiophthalimide available from Sanshin Chemical Industry Co., Ltd.

Benzoic acid: available from Aldrich Corporation

Microballoons: "Expancel (registered trademark) 909-80DU" (resin capsule encapsulating a hydrocarbon having a low boiling point in a shell formed from a thermoplastic resin, volume average particle size: 18 μm to 24 μm, expansion starting temperature: 120° C. to 130° C.) available from Akzo Nobel Company The unvulcanized rubber sheet having a fan shape and the cap member were prepared using the outer layer rubber composition. It is noted that the outer layer rubber sheet was formed with a fixed thickness. The unvulcanized rubber sheet having a rectangular shape was prepared using the inner layer rubber composition. It is noted that the inner layer rubber sheet was formed with a thickness gradually becoming thicker from one end toward another end. The inner layer rubber sheet was wound around a mandrel, and then the outer layer rubber sheet was laminated and wound around the inner layer rubber sheet. The mandrel wound with these rubber sheets, and the cap member were charged into a mold having a groove pattern on the cavity surface thereof. A heat treatment was performed at a mold temperature of 160° C. for 15 minutes to obtain golf club grips. In the obtained golf club grips, the cylindrical portion had a thickness of 1.5 mm at the thinnest part (the end on the head side), and a thickness of 6.7 mm at the thickest part (the end on the grip end side). In addition, the surface of the obtained grips was buffed with an abrasive paper (#80).

TABLE 4

| | Grip No. | 1 | 2 | 3 | 4 | 5 | 6 | 7 |
|---|---|---|---|---|---|---|---|---|
| Outer layer | Rubber composition No. | E | F | G | H | I | J | K |
| | Material hardness (Shore A) | 36 | 35 | 38 | 43 | 50 | 37 | 35 |
| | tanδ (30° C., 10 Hz) | 0.094 | 0.102 | 0.096 | 0.124 | 0.120 | 0.087 | 0.092 |
| | E* (30° C., 10 Hz) (MPa) | 2.53 | 2.06 | 2.49 | 4.50 | 7.63 | 2.44 | 2.00 |
| | tanδ/(E*)$^{0.2}$ | 0.078 | 0.088 | 0.080 | 0.092 | 0.080 | 0.073 | 0.080 |
| | Type | Solid | Solid | Solid | Solid | Solid | Solid | Solid |
| | Thickness (mm) | 0.2 | 0.2 | 0.2 | 0.2 | 0.2 | 0.2 | 0.2 |
| Inner layer | Rubber composition No. | a | a | a | a | a | a | a |
| | Material hardness (Shore A) | 39 | 39 | 39 | 39 | 39 | 39 | 39 |
| | Type | Foamed | Foamed | Foamed | Foamed | Foamed | Foamed | Foamed |
| | Foaming ratio | 3.3 | 3.3 | 3.3 | 3.3 | 3.3 | 3.3 | 3.3 |
| Evaluation | Weight (g) | 23 | 23 | 23 | 23 | 23 | 23 | 23 |
| | Frictional coefficient | 110 | 127 | 116 | 107 | 119 | 113 | 115 |

TABLE 5

| | Grip No. | 8 | 9 | 10 | 11 | 12 | 13 | 14 |
|---|---|---|---|---|---|---|---|---|
| Outer layer | Rubber composition No. | L | M | N | O | P | Q | A |
| | Material hardness (Shore A) | 40 | 40 | 43 | 48 | 55 | 39 | 40 |
| | tanδ (30° C., 10 Hz) | 0.088 | 0.101 | 0.101 | 0.104 | 0.111 | 0.104 | 0.080 |
| | E* (30° C., 10 Hz) (MPa) | 2.82 | 2.68 | 3.39 | 5.30 | 9.65 | 2.81 | 2.53 |
| | tanδ/(E*)$^{0.2}$ | 0.071 | 0.083 | 0.079 | 0.075 | 0.070 | 0.085 | 0.066 |
| | Type | Solid | Solid | Solid | Solid | Solid | Solid | Solid |
| | Thickness (mm) | 0.2 | 0.2 | 0.2 | 0.2 | 0.2 | 0.2 | 0.2 |
| Inner layer | Rubber composition No. | a | a | a | a | a | a | a |
| | Material hardness (Shore A) | 39 | 39 | 39 | 39 | 39 | 39 | 39 |
| | Type | Foamed | Foamed | Foamed | Foamed | Foamed | Foamed | Foamed |
| | Foaming ratio | 3.3 | 3.3 | 3.3 | 3.3 | 3.3 | 3.3 | 3.3 |
| Evaluation | Weight (g) | 23 | 23 | 23 | 23 | 23 | 23 | 23 |
| | Frictional coefficient | 123 | 120 | 109 | 104 | 109 | 114 | 100 |

| | Grip No. | 15 | 16 | 17 | 18 | 19 | 20 |
|---|---|---|---|---|---|---|---|
| Outer layer | Rubber composition No. | B | C | D | R | S | T |
| | Material hardness (Shore A) | 43 | 49 | 51 | 41 | 37 | 42 |
| | tanδ (30° C., 10 Hz) | 0.085 | 0.094 | 0.106 | 0.082 | 0.119 | 0.077 |
| | E* (30° C., 10 Hz) (MPa) | 3.16 | 4.92 | 8.24 | 2.79 | 2.52 | 2.66 |
| | tanδ/(E*)$^{0.2}$ | 0.067 | 0.068 | 0.070 | 0.067 | 0.099 | 0.063 |
| | Type | Solid | Solid | Solid | Solid | Solid | Solid |
| | Thickness (mm) | 0.2 | 0.2 | 0.2 | 0.2 | 0.2 | 0.2 |
| Inner layer | Rubber composition No. | a | a | a | a | a | a |
| | Material hardness (Shore A) | 39 | 39 | 39 | 39 | 39 | 39 |
| | Type | Foamed | Foamed | Foamed | Foamed | Foamed | Foamed |
| | Foaming ratio | 3.3 | 3.3 | 3.3 | 3.3 | 3.3 | 3.3 |
| Evaluation | Weight (g) | 23 | 23 | 23 | 23 | 23 | 23 |
| | Frictional coefficient | 103 | 95 | 93 | 101 | 103 | 92 |

The grips No. 1 to 13 are cases where the rubber composition for forming the outermost surface layer (outer layer) contains (A) the base rubber and (B) the tackifier, and a portion formed from the rubber composition has a loss tangent (tan δ) (30° C., 10 Hz) and a complex elastic modulus (E*) (30° C., 10 Hz) satisfying a relationship of $0.070 \leq \tan \delta/(E^*)^{0.2} \leq 0.098$. These grips No. 1 to 13 had excellent anti-slipping performance.

The grips No. 14 to 17 are cases where the rubber composition for forming the outermost surface layer (outer layer) does not contain (B) the tackifier. These grips No. 14 to 17 had inferior anti-slipping performance. The grips No. 18 to 20 are cases where a portion formed from the rubber composition has a loss tangent (tan δ) (30° C., 10 Hz) and a complex elastic modulus (E*) (30° C., 10 Hz) not satisfying a relationship of $0.070 \leq \tan \delta/(E^*)^{0.2} \leq 0.098$. These grips No. 18 to 20 had inferior anti-slipping performance.

This application is based on Japanese patent application No. 2019-188730 filed on Oct. 15, 2019, the contents of which are hereby incorporated by reference.

The invention claimed is:

1. A golf club grip comprising an outermost surface layer, wherein at least a part of the outermost surface layer is formed from a rubber composition containing (A) a base rubber and (B) a tackifier having a softening point in a range of from 5° C. to 120° C.,
    (A) the base rubber contains at least one member selected from the group consisting of a natural rubber, an isoprene rubber, an ethylene-propylene-diene rubber and a butyl rubber, and
    a portion formed from the rubber composition has a loss tangent (tanδ) (30° C., 10 Hz) and a complex elastic modulus (E*) (30° C., 10 Hz) satisfying a relationship of $0.070 \leq \tan\delta/(E^*)^{0.2} \leq 0.098$ and wherein the loss tangent is in a range from 0.086 to 0.14.

2. The golf club grip according to claim 1, wherein the rubber composition has the complex elastic modulus (E*) in a range of from 2.0 MPa to 10 MPa.

3. The golf club grip according to claim 1, wherein (B) the tackifier having the softening point in the range of from 5° C. to 120° C. contains at least one member selected from the group consisting of a rosin ester, a hydrogenated rosin ester, a disproportionated rosin ester, an ethylene-vinyl acetate copolymer, a phenol resin, a terpene resin and a xylene resin.

4. The golf club grip according to claim 1, wherein an amount of (B) the tackifier ranges from 3 parts by mass to 30 parts by mass with respect to 100 parts by mass of (A) the base rubber.

5. The golf club grip according to claim 1, wherein the rubber composition further contains a reinforcing material in an amount ranging from 2.0 parts by mass to 50 parts by mass with respect to 100 parts by mass of (A) the base rubber, and a mass ratio (the reinforcing material/(B) the tackifier) of the reinforcing material to (B) the tackifier ranges from 0.1 to 5.0.

6. The golf club grip according to claim 1, wherein the rubber composition has a material hardness in a range of from 25 to 60 in Shore A hardness.

7. The golf club grip according to claim 1, wherein the rubber composition further contains a crosslinking agent and optionally a vulcanization accelerator and/or a vulcanization activator.

8. The golf club grip according to claim 1, comprising a cylindrical inner layer and a cylindrical outer layer covering the cylindrical inner layer, wherein the cylindrical outer layer is formed from the rubber composition, and the cylindrical inner layer is formed from a rubber composition or a resin composition, wherein the rubber composition for forming the cylindrical outer layer has a material hardness in a range of from 25 to 60 in Shore A hardness, and the rubber composition or resin composition for forming the cylindrical inner layer has a material hardness in a range of from 30 to 60 in Shore A hardness.

9. The golf club grip according to claim 1, wherein a total amount of the natural rubber, isoprene rubber, ethylene-propylene-diene rubber and butyl rubber in (A) the base rubber is 70 mass % or more.

10. A golf club comprising a shaft, a head provided on one end of the shaft, and a grip provided on another end of the shaft, wherein the grip is a golf club grip comprising an outermost surface layer,
    wherein at least a part of the outermost surface layer is formed from a rubber composition containing (A) a base rubber and (B) a tackifier having a softening point in a range of from 5° C. to 120° C.,
    (A) the base rubber contains at least one member selected from the group consisting of a natural rubber, an isoprene rubber, an ethylene-propylene-diene rubber and a butyl rubber, and
    a portion formed from the rubber composition has a loss tangent (tanδ) (30° C., 10 Hz) and a complex elastic modulus (E*) (30° C., 10 Hz) satisfying a relationship of $0.070 \leq \tan\delta/(E^*)^{0.2} \leq 0.098$ and wherein the loss tangent is in a range from 0.086 to 0.14.

11. The golf club according to claim 10, wherein the rubber composition has the complex elastic modulus (E*) in a range of from 2.0 MPa to 10 MPa.

12. The golf club according to claim 10, wherein (B) the tackifier having the softening point in the range of from 5° C. to 120° C. contains at least one member selected from the group consisting of a rosin ester, a hydrogenated rosin ester, a disproportionated rosin ester, an ethylene-vinyl acetate copolymer, a phenol resin, a terpene resin and a xylene resin.

13. The golf club according to claim 10, wherein an amount of (B) the tackifier ranges from 3 parts by mass to 30 parts by mass with respect to 100 parts by mass of (A) the base rubber.

14. The golf club according to claim 10, wherein the rubber composition further contains a reinforcing material in an amount ranging from 2.0 parts by mass to 50 parts by mass with respect to 100 parts by mass of (A) the base rubber, and a mass ratio (the reinforcing material/(B) the tackifier) of the reinforcing material to (B) the tackifier ranges from 0.1 to 5.0.

15. The golf club according to claim 10, wherein the rubber composition has a material hardness in a range of from 25 to 60 in Shore A hardness.

16. The golf club according to claim 10, wherein the rubber composition further contains a crosslinking agent and optionally a vulcanization accelerator and/or a vulcanization activator.

17. The golf club according to claim 10, wherein the golf club grip comprises a cylindrical inner layer and a cylindrical outer layer covering the cylindrical inner layer,
    wherein the cylindrical outer layer is formed from the rubber composition, and the cylindrical inner layer is formed from a rubber composition or a resin composition,
    wherein the rubber composition for forming the cylindrical outer layer has a material hardness in a range of from 25 to 60 in Shore A hardness, and
    the rubber composition or resin composition for forming the cylindrical inner layer has a material hardness in a range of from 30 to 60 in Shore A hardness.

18. The golf club according to claim 10, wherein a total amount of the natural rubber, isoprene rubber, ethylene-propylene-diene rubber and butyl rubber in (A) the base rubber is 70 mass % or more.

\* \* \* \* \*